(12) United States Patent
Brady, Sr. et al.

(10) Patent No.: US 7,739,979 B2
(45) Date of Patent: Jun. 22, 2010

(54) TUMBLE BREADING SYSTEM, AND RELATED METHOD

(75) Inventors: Dennis Dean Brady, Sr., Morrisville, MO (US); Quentin Duane Pendergrass, Springfield, MO (US)

(73) Assignee: John Bean Technologies Corporation, Chicago, IL (US)

( * ) Notice: Subject to any disclaimer, the term of this patent is extended or adjusted under 35 U.S.C. 154(b) by 45 days.

(21) Appl. No.: 11/998,111

(22) Filed: Nov. 28, 2007
(Under 37 CFR 1.47)

(65) Prior Publication Data
US 2008/0305224 A1 Dec. 11, 2008

Related U.S. Application Data

(60) Provisional application No. 60/861,758, filed on Nov. 28, 2006.

(51) Int. Cl.
*B05C 19/04* (2006.01)
(52) U.S. Cl. .......................... 118/19; 118/308; 118/416; 118/417; 118/418; 99/494
(58) Field of Classification Search .................. 118/13, 118/19, 308, 416, 417, 418; 99/494; 198/527, 198/547, 567, 603; 426/295
See application file for complete search history.

(56) References Cited

U.S. PATENT DOCUMENTS

| 3,097,967 | A |   | 7/1963  | Fries            |         |
|-----------|---|---|---------|------------------|---------|
| 3,102,052 | A |   | 8/1963  | Ackles           |         |
| 3,595,680 | A |   | 7/1971  | Fischer          |         |
| 4,078,517 | A |   | 3/1978  | Castellano et al.|         |
| 4,108,301 | A | * | 8/1978  | Trozzi           | 198/633 |
| 5,052,330 | A |   | 10/1991 | Stacy            |         |
| 5,238,493 | A |   | 8/1993  | Miller           |         |
| 5,647,905 | A | * | 7/1997  | Bertrand et al.  | 118/16  |

(Continued)

FOREIGN PATENT DOCUMENTS

EP 1 658 777 A1 5/2006

OTHER PUBLICATIONS

International Search Report mailed Jun. 3, 2008, issued in corresponding International Application No. PCT/US2007/024482, filed Nov. 28, 2007.

(Continued)

*Primary Examiner*—Laura Edwards
(74) *Attorney, Agent, or Firm*—Christensen O'Connor Johnson Kindness PLLC

(57) ABSTRACT

A tumble breading system for applying a breading material to a food includes a housing designating an internal clean area, and an infeed belt for conveying the breading material and the food, arranged across the infeed belt in an infeed order, into the clean area. A rotary assembly with a plurality of vertically offset, rotating tumblers accepts and tumbles the food with the breading material as the tumblers rotate, to bread the food. An output belt accepts the breaded food from the tumblers and conveys the breaded foods from the clean area and the housing. The food arrives at the output belt in substantially the infeed order.

22 Claims, 9 Drawing Sheets

U.S. PATENT DOCUMENTS

| | | | |
|---|---|---|---|
| 5,728,216 | A | 3/1998 | London |
| 5,937,744 | A | 8/1999 | Nothum, Sr. et al. |
| 6,117,235 | A | 9/2000 | Toccaceli et al. |
| 6,244,170 | B1 | 6/2001 | Whited et al. |
| 6,269,739 | B1 | 8/2001 | Bettcher et al. |
| 6,952,992 | B2 | 10/2005 | Riubrugent |
| 7,231,885 | B1 * | 6/2007 | Nothum et al. ............... 118/13 |
| 2006/0032384 | A1 | 2/2006 | Muniga et al. |
| 2006/0127532 | A1 | 6/2006 | Degady |

OTHER PUBLICATIONS

Written Opinion of the International Searching Authority mailed Jun. 3, 2008, issued in corresponding International Application No. PCT/US2007/024482, filed Nov. 28, 2007.

Communication Pursuant to Article 94(3) EPC, mailed Nov. 2, 2009, issued in corresponding European Patent Application No. 07862274.3, filed Nov. 28, 2007.

Extended European Search Report, mailed Mar. 31, 2010, issued in corresponding European Patent Application No. 101550531.1, filed Nov. 28, 2007 (5 pages).

* cited by examiner

TUMBLE BREADING SYSTEM, AND RELATED METHOD

RELATED APPLICATION

This application claims priority to U.S. Patent Application Ser. No. 60/861,758, filed Nov. 28, 2006, the disclosure of which is incorporated herein by reference.

BACKGROUND OF THE INVENTION

The present invention relates to breading machines for applying a coating of breading substance to the outer surface of a food stuff. Breading machines attempt to replicate the quality of hand breading, which often entails a worker rolling food stuff in a bowl of breading material, or shaking the food stuff in custom baskets of breading material. Both drum/roller machines and linear/assembly breaders offer increased efficiency over hand breading, allowing few workers to bread many food stuffs in a shorter period of time.

When breading with a drum or roller machine, the food stuff to be breaded is placed within or fed into an inner chamber of the machine, such as a rotary drum. Breading material is added, and the food stuff and breading material are tumbled together within the rotary drum, to adhere the breading material to the outer surface of the food stuff. This often necessitates applying a liquid or batter to the outer surface of the food stuff prior to placing it in the rotary drum, to facilitate adhesion of the breading material. Rotary drums are also used to dislodge excess breading material, which may have been applied to the food stuff by different means. However, there are limits to the number of food products that can be tumbled together at any one time, and thus the efficiency of these machines is limited. Additionally, breaded food stuffs generally exit the rotary drum in a heap, requiring labor to separate the breaded product across a belt, where the product is to be packaged or cooked in an assembly line process. Disruption of the breaded food stuffs during separation may result in loss of the breading material.

Linear breaders attempt to increase efficiency over drum or roller machines, by using moving belts or grates to conduct food stuffs through a breading process. Typically, the food stuff to be breaded is placed on the belt or grate and breading material is poured or dumped onto the surface of the food stuff as it moves along the line. Early assembly or conveyor breaders generally included a single conveyor belt onto which breading material was placed, either by hand or by mechanical means, such as gravity spill or conveyance by auger. Once the breading material was on the surface of the conveyor, the food stuff to be breaded was placed on top of the breading material by a worker. Additional breading material would then be dumped on top of the food stuff as it moved along the conveyor line. A second worker would then remove the food stuff for packaging.

More recently assembly breaders with multiple conveyors have been introduced, in an effort to better coat food stuff and more closely replicate hand breading. Food stuff may be dropped from one conveyor to another, sometimes hitting bars or other assemblies meant to flip the food stuff so that, in theory, all sides of the food stuff are exposed to breading materials. One such machine is described in U.S. Pat. No. 5,238,493 to Miller. Food stuffs processed by the Miller device are dropped from one conveyor belt onto another. The food stuff may flip in this process; however, dropping food stuff from one conveyor belt onto another increases the likelihood of damage to the food stuff. For example, as food stuff drops from one belt to another, it may breaks apart or be otherwise damaged. Further, as the product drops from one conveyor belt to the next conveyor belt, much of the breading material is actually dislodged from the surface of the food stuff. While multiple flipping conveyor belts aid in exposing all sides of the food stuff to the breading material, it is difficult to achieve a consistent uniform coating of thick breading, as desired for "home style" coating, with devices such as Miller's.

U.S. Pat. No. 5,728,216 to London seeks to remedy such drawbacks. The London patent recognizes the inherent benefit of tumbling a product in a volume of breading material rather than flipping the product along multiple conveyor lines. London utilizes a plurality of "tumble chambers" into which food stuffs are conveyed throughout a line process. As the food stuff is placed into a tumble chamber, it is allowed to tumble in a volume of breading material until all outer surface areas of the food stuff is coated. The London device, however, is relatively complex in that food stuffs are placed on a belt which periodically is allowed to slacken to form the tumble chambers. Once the tumbling process is completed, the conveyor belt is pulled taut by rollers which then allow the food stuff to move along the assembly line. The repetitive slackening and tightening of the conveyor belt subjects the system to rapid wear and continued maintenance, which may decrease overall efficiency. This problem is heightened by the fact that the breading material used in these machines can causes rapid wear of belts, rollers and gear assemblies. Moreover, conventional breading materials stick to virtually all parts of a breading machine which, due to health standards, must be continually cleaned.

SUMMARY OF THE INVENTION

Prior art breading machines have commonly been subject to a trade-off between efficiency and quality of coating. Machines such as rotary drums that can achieve homestyle breading quality (e.g., a thick, rough coating with breading forced into muscle, pores or cavities of the food) sacrifice efficiency. Breaded food products exit the rotary drum in a heap, which must then be separated. It is not uncommon, in commercial breading, to employ up to six people to simply spread breaded product across a belt after the product is discharged from a drum breader. This increases labor costs, and may further decrease efficiency since separation can cause breading material to be dislodged, either necessitating re-breading of foods if quality is to be maintained. Machines such as the line assembly, which move large volumes of food stuff or food products (referred to hereinafter as "food" or "foods") in a short period of time, and generally maintaining order of the foods throughout breading, conventionally produce thinly or non-uniformly breaded foods. Prior art machines have not met both objectives of efficiency and homestyle quality of breading. The disclosed tumble breading system achieves both of these objectives, subjecting the surfaces of the food to a wave or curtain of breading material and then gently turning or tumbling the food in a "charge" or volume of breading material.

In one embodiment, a tumble breading system for applying a breading material to a food has an infeed belt for conveying the food and a quantity of breading material into a housing. A plurality of rotary tumblers within the housing accept the food and the breading material and tumble the food with the breading material, to bread the food. An output belt accepts the breaded food from the tumblers and conveys the breaded food from the housing.

In one embodiment, a tumble breading system for applying a breading material to a food includes a housing designating an internal clean area, and an infeed belt for conveying the breading material and the food, arranged across the infeed belt in an infeed order, into the clean area. A rotary assembly with a plurality of vertically offset rotating tumblers accepts and tumbles the food with the breading material as the tumblers rotate, to bread the food. An output belt accepts the breaded food from the tumblers and conveys the breaded foods from the clean area and the housing. The food arrives at the output belt in substantially the infeed order.

In one embodiment, a tumble breading system for applying a breading material to a food includes a rotary assembly for fitting with a breading machine, proximate an infeed to the machine. The rotary assembly has a first tumbler with a plurality of first longitudinal channels, for consecutively accepting the food from the infeed as the tumbler rotates to expose subsequent first longitudinal channels, and for rotating the food with breading material, within the first longitudinal channels; and at least a second tumbler offset beneath the first tumbler and having a plurality of second longitudinal channels for consecutively accepting the food and the breading material from the plurality of first channels, as the second tumbler rotates opposite the first tumbler. Rotation of the food with the breading material works the breading material into and onto the food.

In one embodiment, a tumble breading system for applying a breading material to a food includes a housing; means for distributing breading material from a breading material chamber within the housing to an infeed belt, across which the food is arranged; and means for passing the food beneath the breading material. A flip belt accepts the food and the breading material from the distribution means. A plurality of vertically offset, counter-rotational tumblers accept the food and the breading material from the flip belt and tumble the food with the breading material as the food and the breading material are passed between the tumblers. An output belt accepts breaded food from the tumblers and allows excess breading material to pass therethrough. A reclamation assembly disposed beneath the tumblers and the output belt sifts the excess breading material to separate reusable breading material from clumped breading material. Reusable breading material passes through the reclamation assembly to the breading chamber.

In one embodiment, a method of tumble-breading food includes distributing breading material across an input belt; distributing food linearly across the breading material, and conveying the food and the breading material to a rotary assembly housed within a tumble breading system. The food and the breading material are tumbled between rotary tumblers of the rotary assembly, to bread the food. The breaded food is transferred to an output belt, and excess breading material is dislodged from the food and the output belt. Dislodged breading material and loose breading material from the tumblers and the output belt are collected and sifted. The sifted breading material is delivered to the input belt.

DETAILED DESCRIPTION OF THE INVENTION

Figure 1:
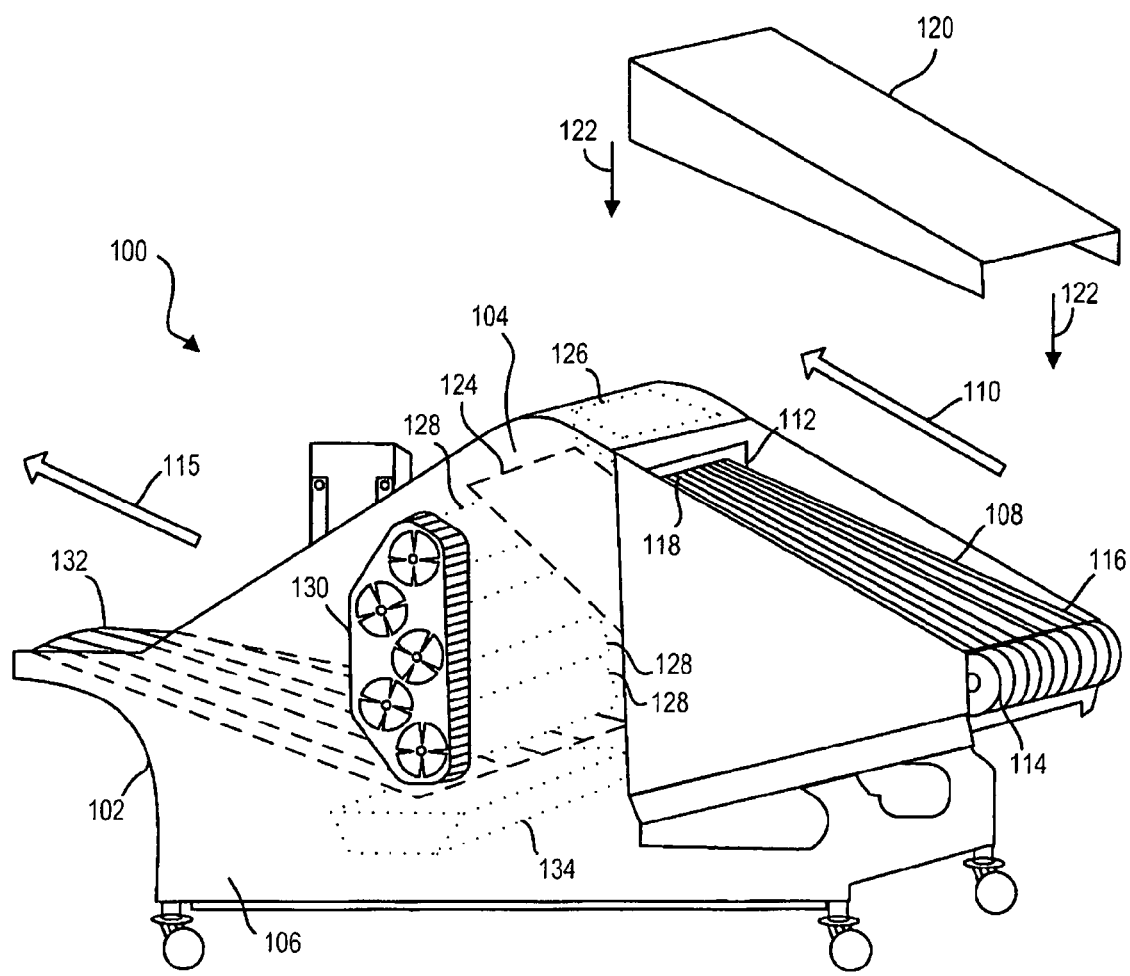
FIG. 1 is a simplified perspective view of a tumble breading system with rotary assembly and belts, according to an embodiment.

FIG. 1 is a simplified perspective view of a tumble breading system 100. System 100 has a housing 102, for example constructed of a frame assembly encapsulated in sheets of stainless steel, or other suitable metal or material for separating an interior clean area 104 where food is breaded (not labeled) from exterior power assemblies that drive the system. Power assemblies are for example located along or configured with an exterior housing surface 106.

An infeed conveyor belt 108 conducts food in the direction of arrow 110, through an input 112 into the clean area 104 within housing 102. Infeed belt 108 is driven by suitable rotational mechanisms, such as rollers 114. For clarity of illustration, only one roller 114 is shown in FIG. 1, at a distal end 116 of infeed belt 108. It will be appreciated that infeed belt 108 may likewise rotate around a second roller 114 at a proximal end 118 of infeed belt 108. Alternately, gears or like rotational mechanisms may be used to guide infeed belt 108. A removable hood 120 fits onto housing 102, as indicated by directional arrows 122, for safety reasons and/or to protect infeed belt 108 and input 112 from dust and other contaminants.

At proximal end 118, food traveling along infeed belt 108 is transferred (e.g., passed or dropped) onto a second conveyor 124, illustrated by a dashed line, within clean area 104. Second belt 124 is referred to hereinafter as a "flip belt," as food may flip partially or completely over during transfer from infeed belt 108. In one embodiment, food passes beneath a breading material hopper 126, illustrated by a dotted line, at or near proximal end 118 and/or flip belt 124. Hopper 126 has bottom openings (not shown) through which breading material drops onto the food, for example when hopper 126 is shaken or vibrated, or when one or more covers blocking the bottom openings is displaced, e.g., by sliding or rotating.

Flip belt 124 conducts food from infeed belt 108 to a plurality of tumblers 128 of a rotary unit 130 (five tumblers are shown in FIG. 1; for clarity, three tumblers 128 are labeled). Tumblers 128, shown by dotted lines, are likewise within clean area 104, whereas power and drive mechanisms of rotary unit 130 are configured with or disposed along exterior surface 106. As described further below with respect to FIG. 2, Tumblers 128 may be offset rollers arranged vertically with respect to one another, each having a plurality of surface concavities or channels for holding breading material and food. In one embodiment, each tumbler is about 10 inches in diameter; however, it will be appreciated that tumbler size may vary as a function of food size, shape or consistency, and desired quality of breading.

Food is passed between tumblers 128 and from tumblers 128 to an output conveyor belt 132. Output belt 132 is for example a mesh belt, a grate or a chain pan having a plurality of openings through which excess breading material may drop downward into a reclamation assembly 134. Output belt 132 conducts breaded food out of housing 102, as indicated by motion arrow 115. System 100 is configured such that infeed belt 108 and output belt 132 are at a height that facilitates use of system 100 with other equipment typically used in the food processing industry. In one embodiment, height of infeed belt 108 and output belt 132 is adjustable.

Reclamation assembly 134 is for example a pan or sieve that empties onto a reclamation apparatus, such as a belt or auger system (see FIGS. 2 and 5, described below) that carries excess breading material back to hopper 126, to infeed belt 108 and/or to tumblers 128, where the material is released to coat additional food traveling along belts 108, 124 or passing through tumblers 128.

Figure 2:
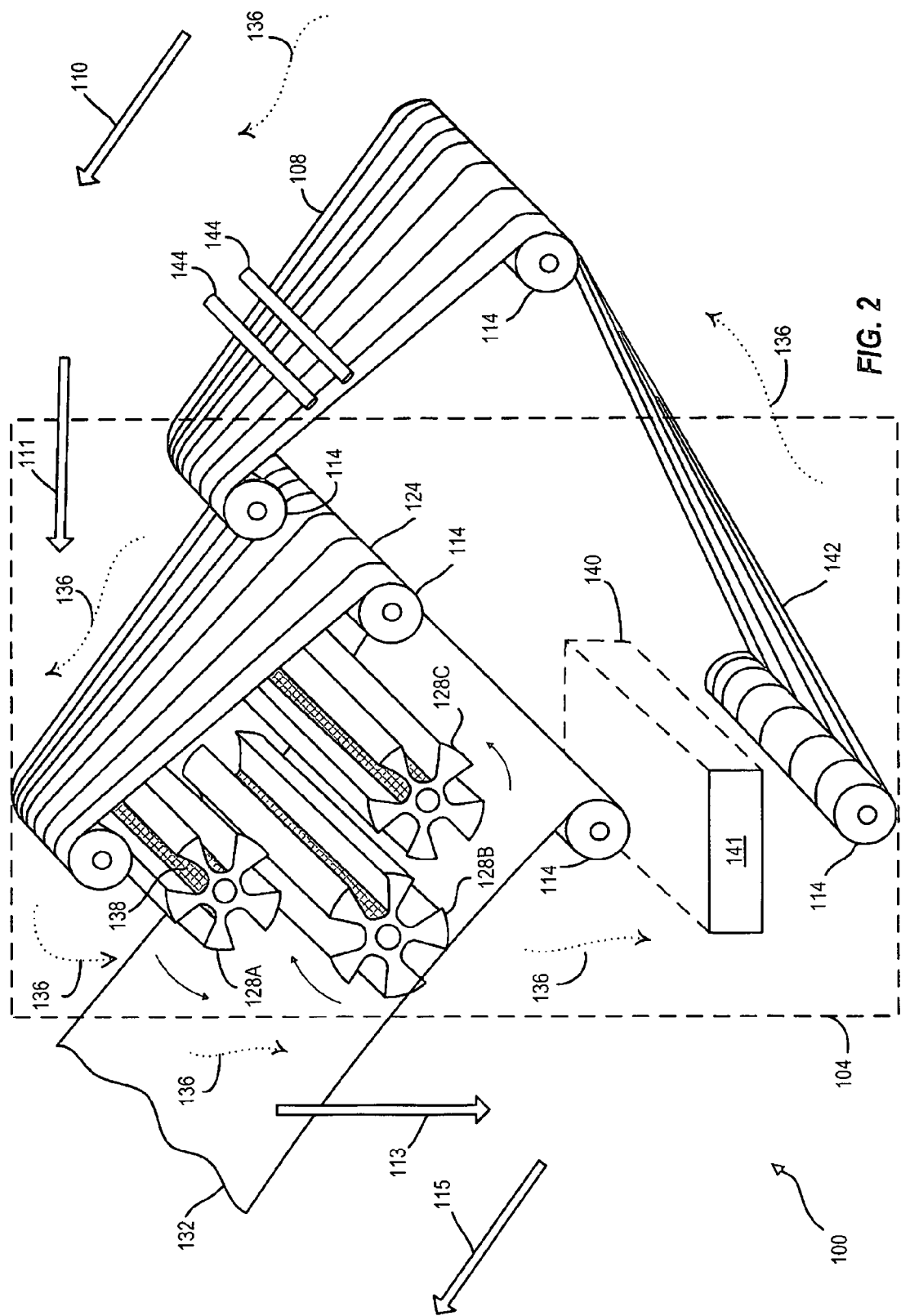
FIG. 2 is a partial perspective view illustrating movement of food and breading material through a tumble breading system, according to an embodiment.

FIG. 2 is a schematic perspective view showing movement of food and breading material through system 100, in accordance with an embodiment. Clean area 104 is indicated by a dotted box. Movement of food through system 100 is indicated by hollow movement arrows 110, 111 and 113. Output of breaded food from system 100, via output belt 132, is indicated by motion arrow 115. Movement of breading material is indicated by dotted movement arrows 136.

As indicated by motion arrow 110, food enters clean area 104 via infeed belt 108, and is transferred to flip belt 124 (see motion arrow 111). Food is for example dropped a short distance onto flip belt 124, to flip the food. From flip belt 124, food is transferred to rotary unit 130 (FIG. 1). FIG. 2 shows a rotary unit 130 having three tumblers 128. Tumblers 128 have longitudinal depressions, cups or channels 138 (indicated by hatching) extending along their length, for holding food and breading material. For clarity, only one channel 138 is labeled in FIG. 2. It will be appreciated that more or less tumblers 128, and/or tumblers having more or less channels 138 may be employed as a matter of design preference. Channel depth and width may likewise be customized. For example, when breading delicate foods such as shrimp or mushrooms, a lesser number of tumblers 128 decreases manipulation of the food by system 100 and may prevent the food from falling apart during breading. Where more robust foods, e.g., chicken, are breaded, more tumblers 128 may be added. Likewise, tumblers 128 may include fewer large channels 138 for breading larger foods, or more smaller channels 138 for breading smaller foods. In one embodiment, rotary unit 130 is provided as a self-contained, removable retro-fit assembly to allow customization of breading and to facilitate cleaning or repair. One system 130 having a set number of tumblers (e.g., 3) may for example be exchanged for another set having more or less tumblers (e.g., two or five), to customize food handling by system 100. Likewise, a system 130 with tumblers 128 having five channels 138 per tumbler may be "swapped" for a system 130 with tumblers having fewer channels 138 per tumbler, as a function of the size and/or type of food being breaded. In one embodiment, rotary system 130 is provided as a retrofit assembly, for fitting the space occupied by a single large drum in a conventional drum breader.

As illustrated in FIG. 2, food passes from flip belt 124 to tumbler 128A. Tumbler 128A rotates to transfer food to tumbler 128B, which in turn rotates opposite the direction of rotation of tumbler 128A, to transfer food to tumbler 128C. See motion arrow 113. Tumbler 128C rotates counter to tumbler 128C (e.g., in the direction of rotation of tumbler 128A) to transfer food to output belt 132, which conducts the breaded food out of clean area 104 and system 100, as indicated by motion arrow 115.

Breading material such as flour, cornmeal or the like may be added to system 100 at hopper 126, described above with respect to FIG. 1. Optionally or additionally, a breading material chamber 140, shown in FIG. 2 as a dotted box, stores and releases breading material within clean area 104. Chamber 140 for example has a door, chute or other breading port 141 opening into an interior container, or simply into a bottom portion of clean area 104. Chamber 140 may also be a slidable drawer for holding breading material. In one embodiment, chamber 140 is combined with reclamation apparatus 134, described above.

Breading material released from chamber 140 is conveyed to infeed belt 108 via an internal breading material conveyor 142. Conveyor 142 is shown as a belt; however, an auger mechanism may likewise be used to deliver breading material to infeed belt 108. Likewise, conveyor 142 and infeed belt 108 may be one and the same. Roller 114 may be a drive sprocket, around which breading material is dragged. Breading material is for example dragged from chamber 140 to form a layer on infeed belt 108. The layer of breading material adheres to food placed thereon.

One or more rollers or finger assemblies 144 create a curtain or wave in the breading material. As food placed upon the breading material passes under finger assembly 144, a top portion of the food is exposed to and may be coated by the wave of breading material. Food and breading material are transferred or, in the case of the food, flipped to flip belt 124, which in turn transfers and/or flips the food and the breading material to tumblers 128.

As the tumblers rotate, the breading material and food are gently turned or tumbled from a channel 138 of one tumbler 128 to a channel 138 on an adjacent tumbler 128. This automated action efficiently replicates the gentle tumbling of a food from one container of breading material to a second container of breading material, as is characteristic of hand breading. For example, tumbler 128A of FIG. 2 rotates counterclockwise to accept additional food and breading material from flip belt 124 into a subsequent longitudinal channel 138, and to transfer the breading material and food to the longitudinal channels 138 of tumbler 128B. Tumbler 128B in turn rotates to expose un-filled longitudinal channels 138 for filling from tumbler 128B, and to transfer the food and breading material to longitudinal channels 138 of tumbler 128C. Tumbling food in multiple quantities of breading material via tumblers 128 works the breading material into pores, muscle, hollows or cracks in the food to achieve a homestyle appearance. Contacting breading material with food at infeed belt 108, finger assembly 144 and flip belt 124, as described above, enhances this effect.

Longitudinal channels 138 span approximately the length of tumblers 128. Hence, food may be transferred between tumblers 128 in the linear arrangement or order in which it lands on or is transferred to flip belt 124. This arrangement for example reflects the arrangement in which food is placed upon infeed belt 108. Breaded food is transferred from the final tumbler 128 in rotary assembly 130 (tumbler 128C, in FIG. 2) onto output belt 132 in substantially the same linear arrangement, facilitating subsequent processing or packaging and reducing or eliminating the need to spread out heaps of food that is common to prior art drum breaders. The gentle rotational action and food alignment provided by tumblers 128 may decrease damage to breaded food, as compared with rotary drum breaders, where food knocks together and against walls of one larger, non-segmented container with greater force. At the same time, tumblers 128 repeatedly expose all sides of the food to the breading material, results in uniform and consistent breading. In addition, alignment features provided by system 100 may reduce or eliminate the need for manual alignment of breaded food, as is needed when breading with conventional drum breaders.

Figure 3:
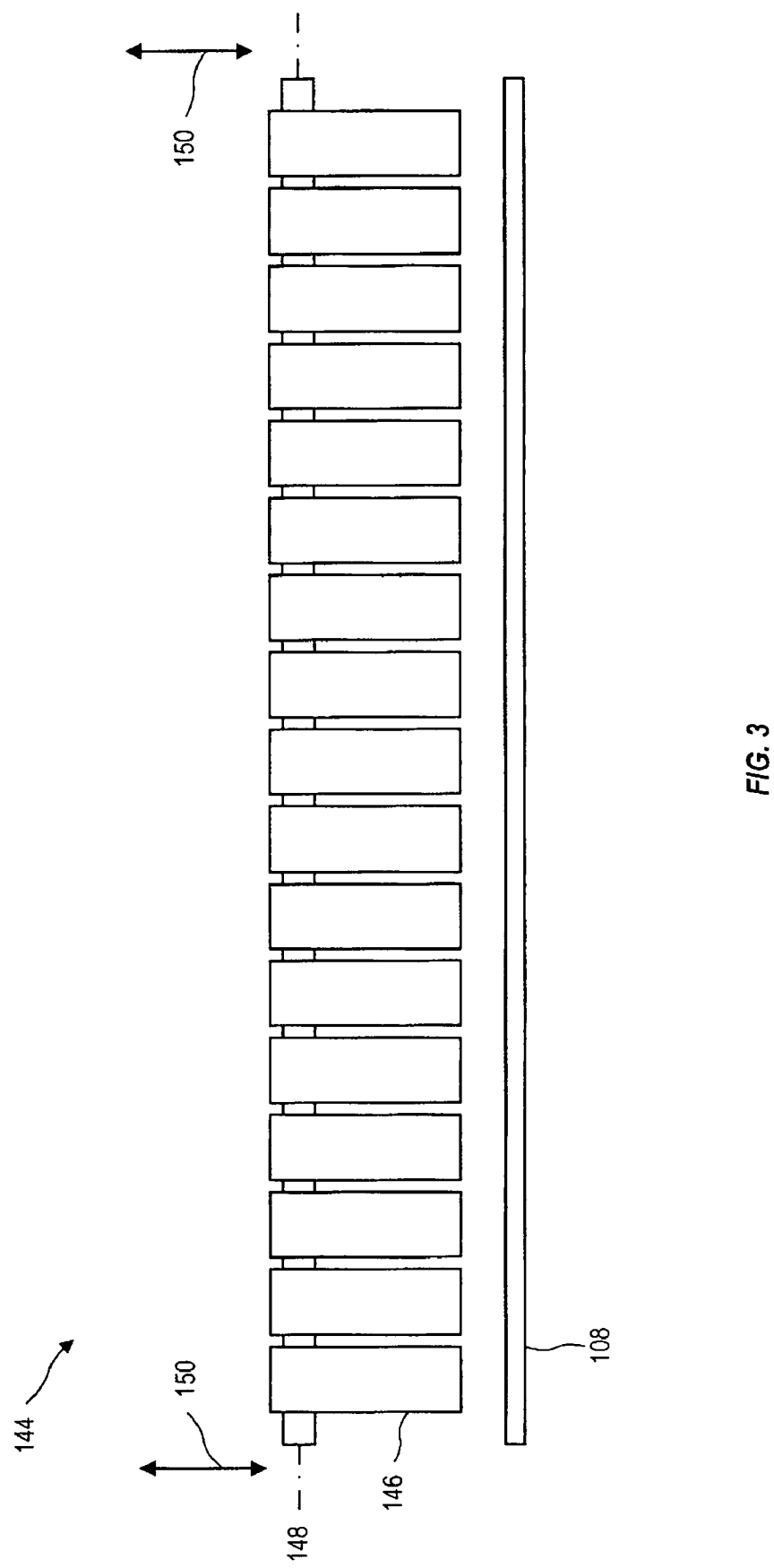
FIG. 3 is a front view of a finger assembly for use with the tumble breading systems of FIGS. 1 and 2.

FIG. 3 is a front view of finger assembly 144 of FIG. 2. Finger assembly 144 has a plurality of fingers 146 supported along a bar 148 that for example attaches to housing 102 of system 100. Fingers 146 are for example plastic, rubber or another material that is flexible enough to permit food passing beneath (e.g., between fingers 146 and infeed belt 108), yet firm enough to encourage the aforementioned wave of breading material, under which the food passes. Optionally, finger assembly 144 rotates to allow food to pass therebeneath. Height of finger assembly 144 may be adjusted up or down, as indicated by arrows 150, to accommodate a range of food sizes.

Figure 4:
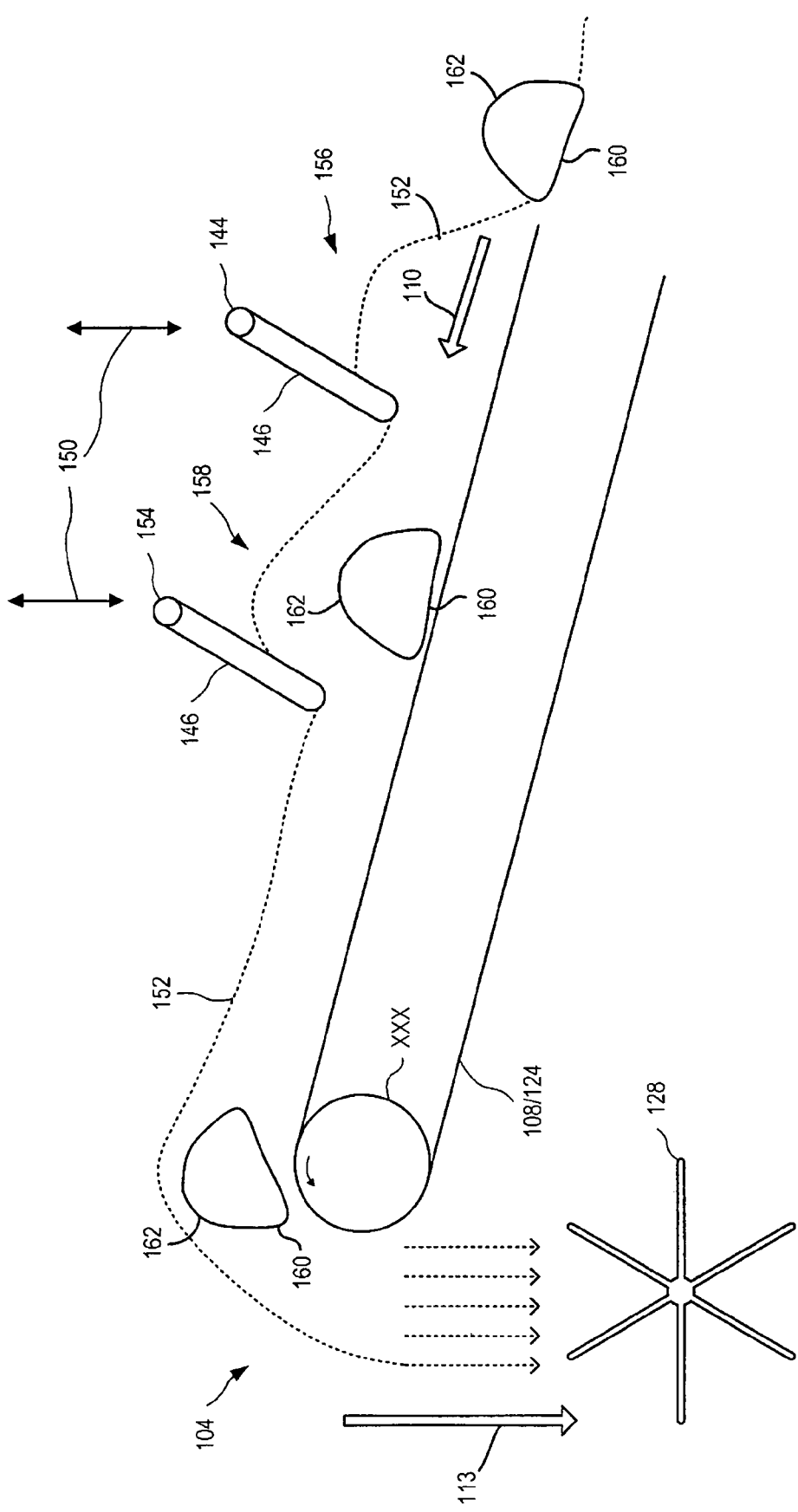
FIG. 4 is a schematic side view showing two finger assemblies of FIG. 3 affecting flow of breading material.

FIG. 4 is a side, plan view further illustrating wave action of finger assembly 144 and breading material, depicted as dotted line 152, with infeed belt 108 or flip belt 124. It will be appreciated that one or more finger assemblies may be positioned with either or both belts. Here, first and second finger assemblies 144 and 154 are positioned over infeed belt 108/124. Breading material 152 builds against fingers 146 of assemblies 144 and 154, creating first and second waves 156 and 158. Food 160 passes beneath waves 156 and 158, as indicated by motion arrow exposing upper food surface 162 to breading material 152. Where the belt in FIG. 4 is flip belt 124, food 160 and breading material 152 leaving flip belt 124 are transferred to channels 138 of tumbler 128, as the belt advances and tumbler 128 rotates to sequentially advance channels 138 to a receiving position. Food 160 and breading material 152 are gently tumbled as tumbler 128 rotates to pass the food and breading materials 160, 152 to a subsequent tumbler 128 of rotary unit 130, e.g., as shown and described above with respect to FIGS. 1 and 2.

Figure 5:
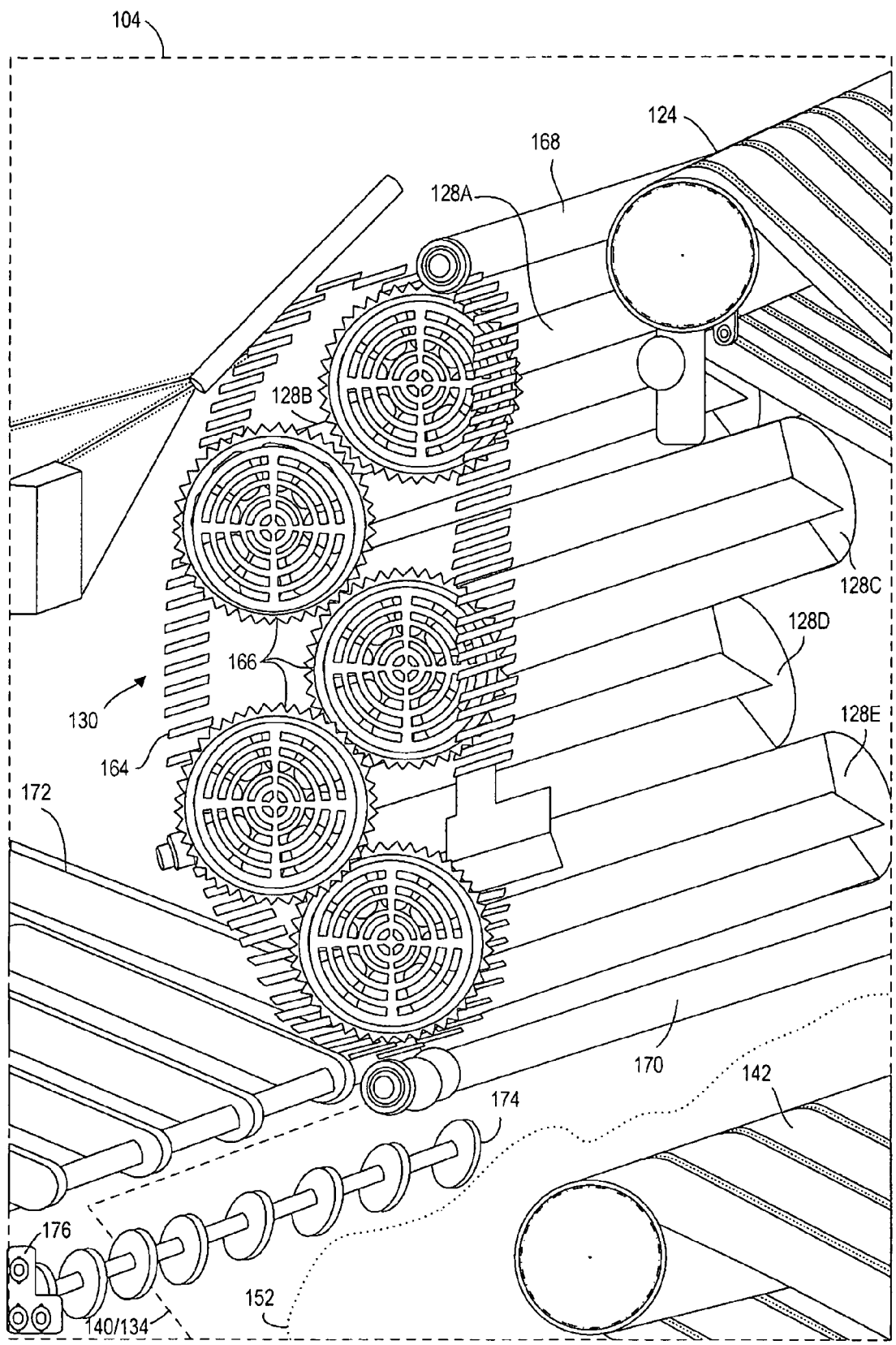
FIG. 5 is a perspective view detailing the rotary assembly and belts of FIG. 1.

FIG. 5 shows further detail of rotary assembly 130, flip belt 124, conveyor 142 and support structures of output belt 132, within clean space 104 (represented by a dashed box). Rotary assembly 130 is for example a removable, independently powered assembly for removably fitting with system 100. As shown, rotary assembly 130 is driven by a belt 164 that interacts with gears 166 of each tumbler 128A-E. For clarity, only three of the five illustrated gears 166 are labeled in FIG. 5.

Rollers 168 and 170 may be used to encourage food 160 (see FIG. 4) along its path from flip belt 124, through rollers 128A-E and onto output belt 132 (see also FIG. 4), for example preventing food 160 from passing over tumbler 128A as it passes from flip belt 124 to rotary assembly 130, and directing food 160 from assembly 130 onto output belt 132, proximate tumbler 128E.

Output belt 132 is for example a mesh or slotted belt supported by tray 172 and rotary assembly 174. Exemplary fasteners 176 (shown as a plate and bold/screw set, although other fasteners may be utilized) are shown securing rotary assembly 174 within housing 102. Encouraged by roller 168, food 160 and breading material 152 (see FIG. 4) pass from infeed belt 108 to a channel 138 (see FIG. 2) of tumbler 128A, which rotates counterclockwise to transfer food 160 and breading material 152 to a channel 138 of tumbler 128B. Tumbler 128B rotates clockwise to transfer food 160 and breading material 152 to a channel 138 of tumbler 128C, which rotates counterclockwise to transfer food 160 and breading material 152 to a channel 138 of tumbler 128D. Finally, tumbler 128D rotates clockwise to transfer food 160 and breading material 152 to a channel 138 of tumbler 128E, which rotates counterclockwise to deposit food 160 and breading material 152 onto output belt 132, supported by the tray and rotary assembly 172, 174 shown in FIG. 5. Roller 170 is for example a stationary or a counterclockwise-rotating cylinder for encouraging food 162 onto output belt 132. Both rollers 168, 170 may be finished with or made from a smooth material, such as silicone, to prevent transfer of breading material 152 from food 160.

Excess breading material 152 falls from rotary assembly 130 to reclamation assembly 134/chamber 140, indicated by a dashed line, where it is conducted to infeed belt 108 via conveyor 142 to bread additional food 160, as described with respect to FIG. 2. Where conveyor 142 is a belt, it may be combined with infeed belt 108 such that system 100 has three independently driven belts 108/142, 124 and 132. Reclamation assembly 134/chamber 140 may be removed from assembly 100 for cleaning and for refilling with additional or alternate breading material 152, as needed.

Figure 6:
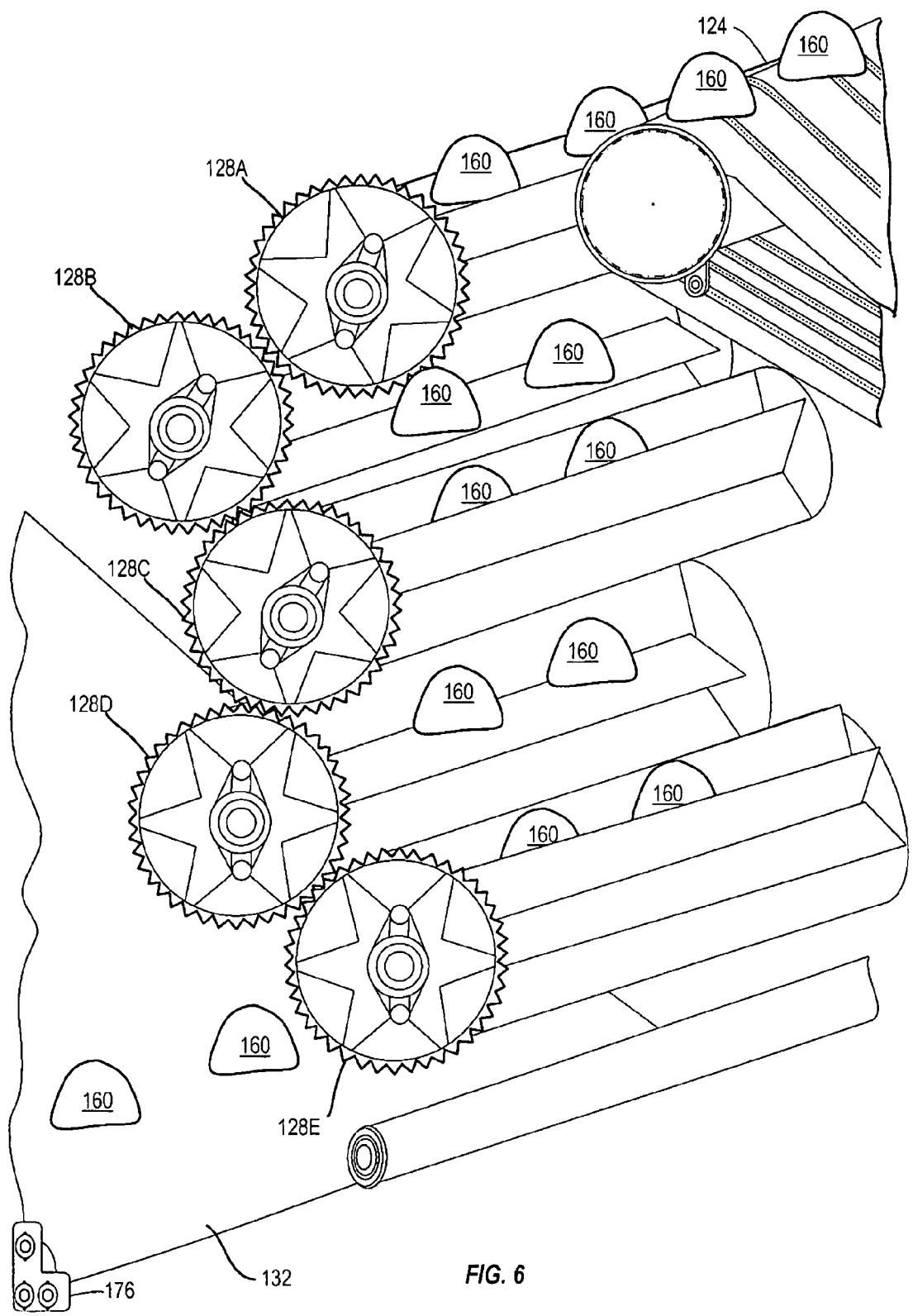
FIG. 6 is a perspective view detailing maintenance of an input order of food by the rotary assembly and belts of FIG. 1.

FIG. 6 is a simplified view of the rotary assembly and belts of FIG. 5, illustrating maintenance of an input order of food 160. As shown, food 160 is arranged roughly in a line across flip belt 124. Food 160 is transferred to tumbler 128A in generally the same linear order, and is passed between tumblers 128B-128E in generally the same linear order. Thus, food 160 is linearly deposited on output belt 132, reducing clumping of breaded food 160.

Figure 7:
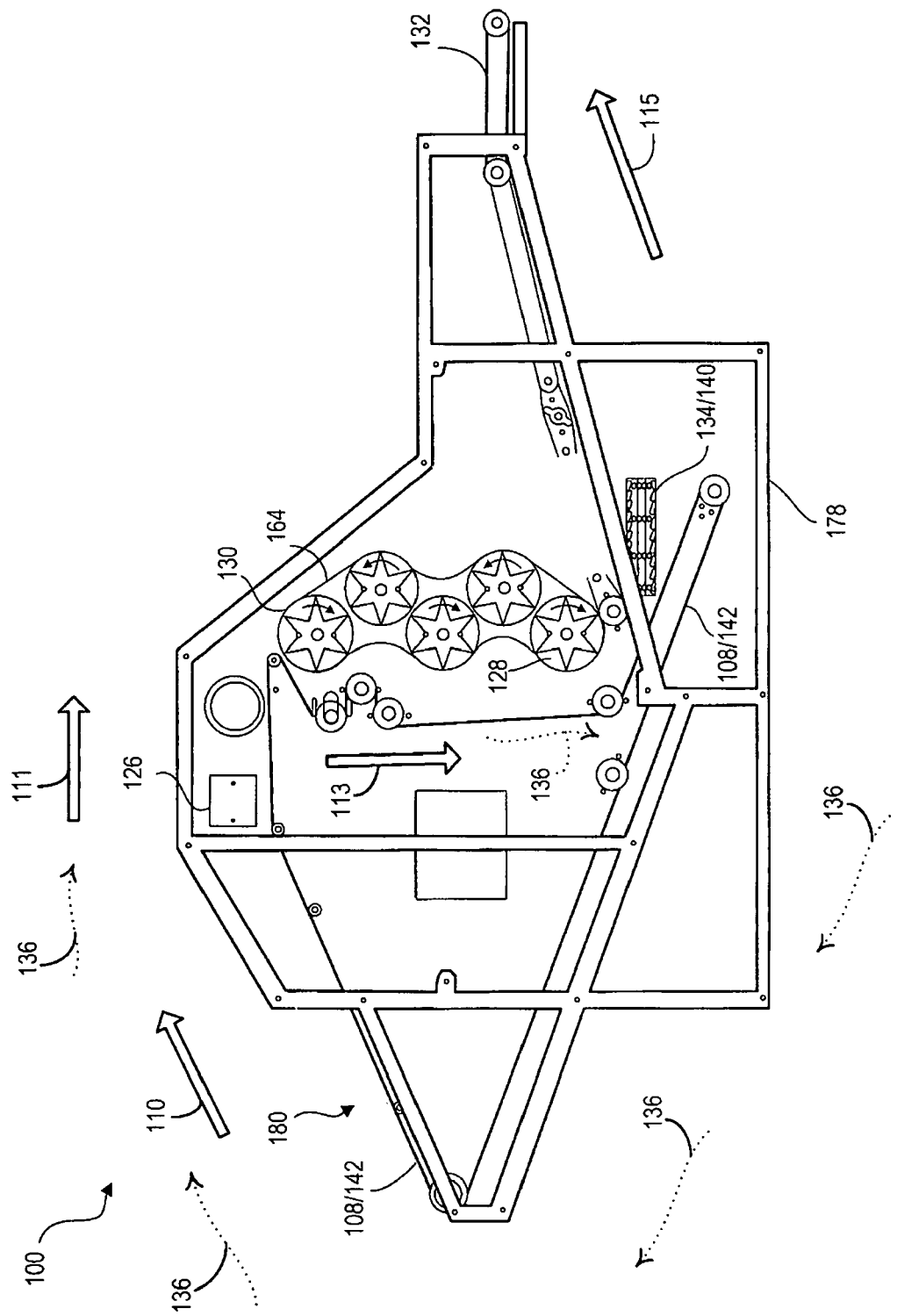
FIG. 7 is a side view showing movement of food and breading material through the tumble breading system of FIG. 1.
Figure 8:
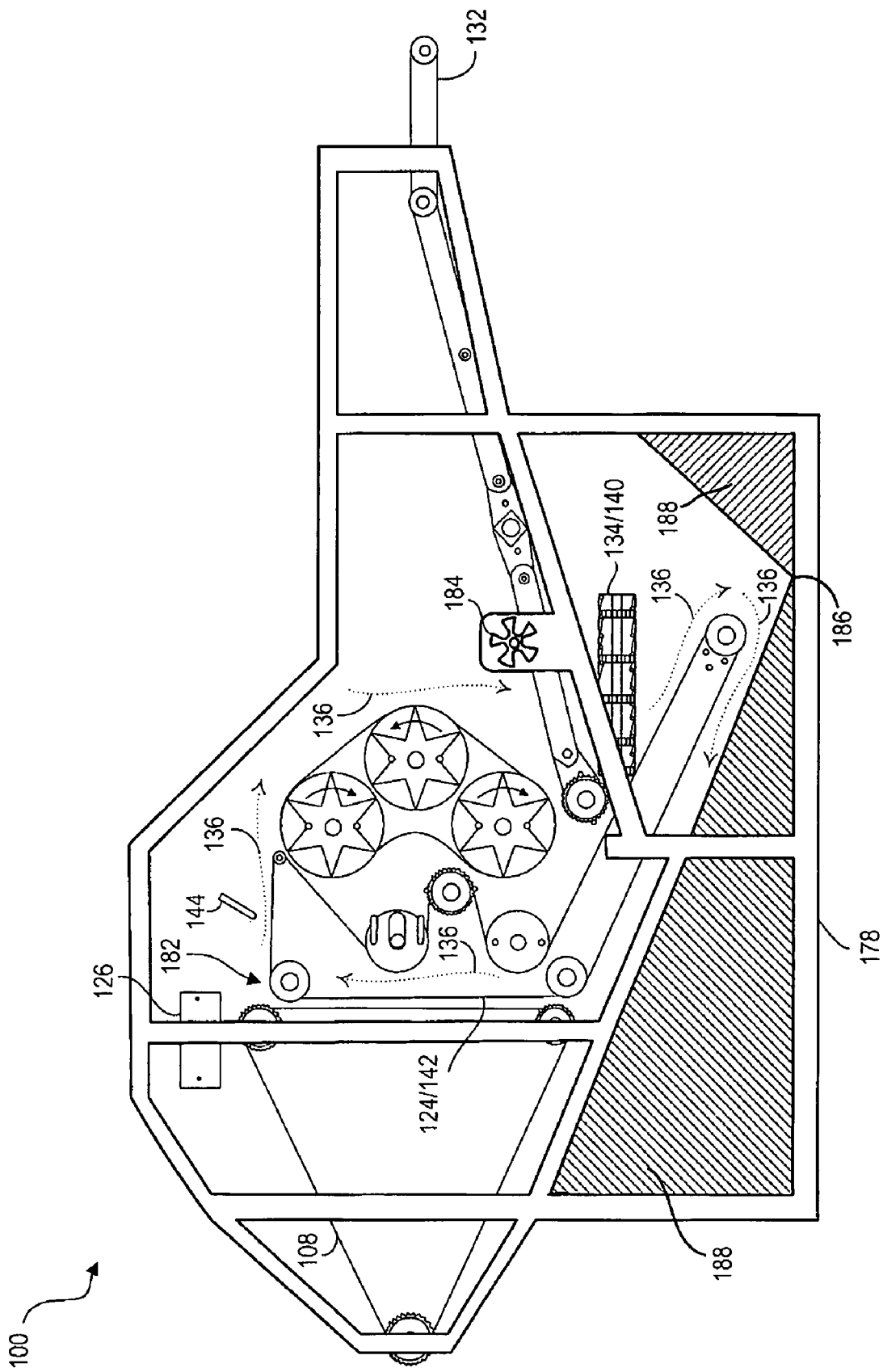
FIG. 8 is another side view showing movement of food and breading material through a tumble breading system, according to an embodiment.

FIGS. 7 and 8 are simplified side views of assembly 100, indicating flow of food 160 and breading material 152 and showing exemplary internal support for housing 102 (see FIG. 1). As described above with respect to FIG. 1, housing 102 may be constructed with a frame assembly, shown here as internal frame 178. Stainless steel or other suitable housing material is supported by internal frame 178 to form housing 102. In one embodiment, shown in FIG. 7, infeed belt 108 and conveyor 142 form one continuous belt 108/142, and flip belt 124 is omitted. As indicated by dotted arrows 136, infeed belt 108/142 transfers breading material 152 from reclamation assembly 134/chamber 140 to a food input area 180, beneath optional hopper 126, where additional breading material 152 may be added, to rotary assembly 130. Rotary assembly 130 is independently driven, e.g., by belt 164. Excess breading material 152 is collected at reclamation assembly 134/chamber 140 and picked up by infeed belt 108/142.

Food processed by system 100 follows the path of arrows 110, 111, 113 and 115. For example, food 160 placed in input area 180 is carried by infeed belt 108/142 beneath optional hopper 126 to rotary assembly 130. Food 160 is tumbled with breading material, via tumblers 128, and passed to output belt 132 for subsequent processing, packaging or cooking.

In one embodiment, illustrated by FIG. 8, infeed belt 108 is an independently driven belt, and flip belt 124 forms a continuous belt with conveyor 142. As indicated by motion arrows 136, breading material 152 (see FIG. 4) is carried from reclamation assembly 134/chamber 140 to a transfer point 182, where food is transferred from infeed belt 108 to continuous belt 124/142. Breading material 152 is conveyed from point 182 along continuous belt 124/142 to rotary assembly 130 (shown here with three large tumblers). Output belt 132 is preferably mesh, slotted or otherwise porous, to allow breading material 152 not adhered to food 160 to pass through, into reclamation assembly 134/chamber 140. System 100 (as shown in any of the previously-described drawings) for example employs a fan or blower 184 to dislodge excess breading material 152 from food 160 and output belt 132. Dislodged breading material 152 falls through mesh or slotted output belt 132 and collects at reclamation assembly 134/chamber 140, which is for example a sieve for allowing fine breading material 152 to pass through and pile at depression 186 of sloped floor 188 while catching clumped breading, which may then be removed from system 100. In one embodiment, output belt 132 vibrates to dislodge excess breading material from food 160 and belt 132, for collection by reclamation assembly 134/chamber 140.

Figure 9:
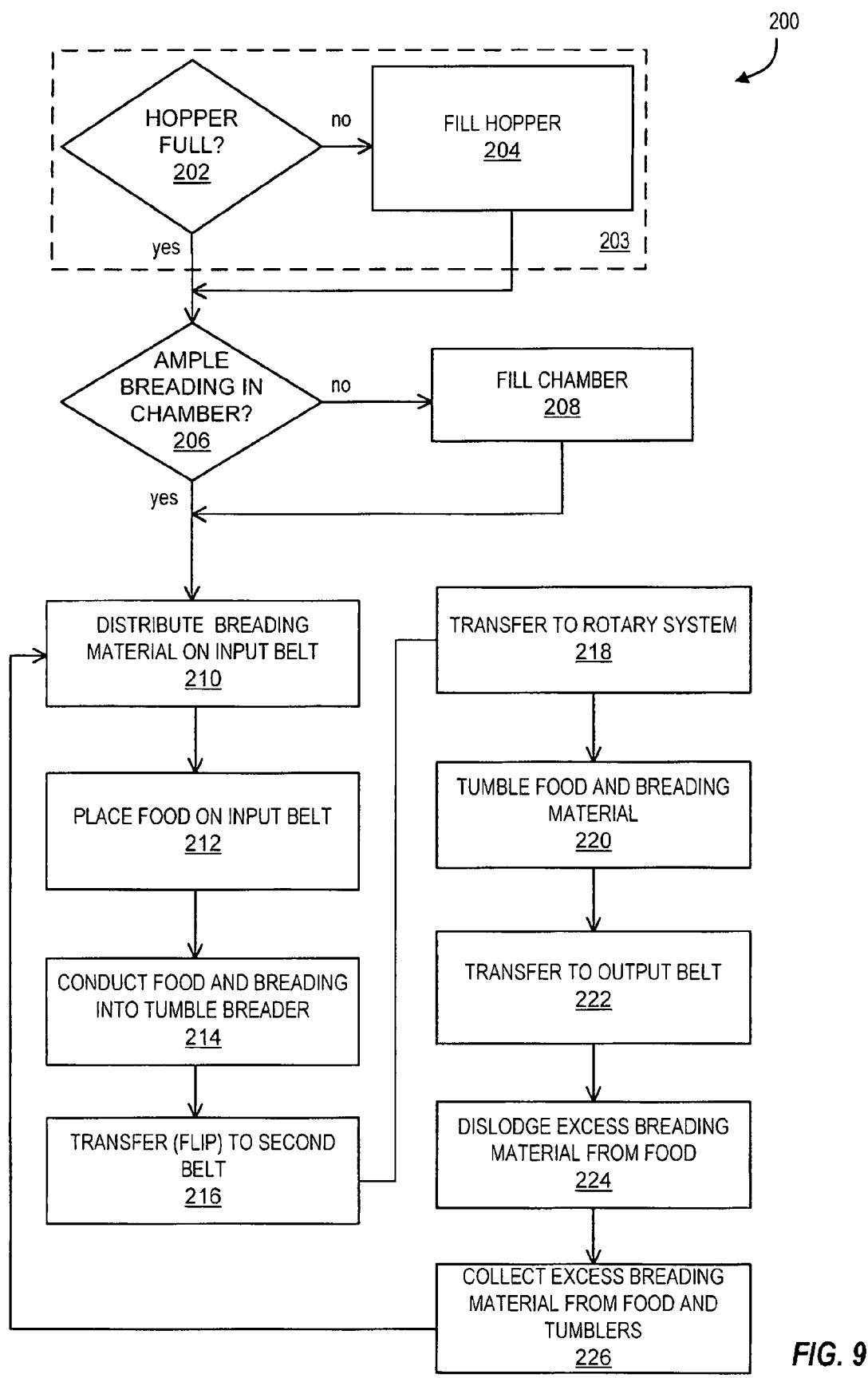
FIG. 9 is a flow chart of one method of tumble breading, according to an embodiment.

FIG. 9 is a flow chart illustrating a tumble breading method 200. Step 202 is a decision. If the hopper is not full, the hopper is filled, in step 204. Steps 202, 204 are optional, as indicated by dotted box 203. In embodiments where breading material is input into a lower chamber of a tumble breading systems, a hopper may be omitted or used optionally. In one example of steps 200, 202, hopper 126 (FIG. 1) is filled with breading material 152 if hopper 126 is not filled to a desired level.

If the hopper contains ample breading material, at optional step 202, a decision 206 is made as to whether ample breading material is contained in a breading chamber, such as chamber 140. If not, the chamber is filled with breading material, in step 208. In one example of step 208, chamber 140 and/or reclamation apparatus 134 is opened via a door or chute in housing 102 and filled with breading material 152. In another example of step 208, chamber 140 and/or reclamation apparatus 134 slides from housing 102, e.g., as a drawer in the housing, for filling.

Once the chamber has ample breading material, the breading material is distributed on an input belt, and food is placed on the input belt, in steps 210, 212. In one example of step 210, breading material conveyor 142 delivers breading material from chamber 140/reclamation apparatus 134 to infeed belt 108. As noted above with respect to FIG. 7, conveyor 142 and infeed belt 108 may form one continuous belt. One or more finger assemblies 144, described with respect to FIGS. 2-4, are for example employed to facilitate distribution of breading material 152 across infeed belt 108 and to create waves of breading material to aid in covering food 160, when placed on infeed belt 108.

In one example of step 212, food 160 is linearly arranged across infeed belt 108, atop breading material 152. Breading material 152 adheres to the bottom of food 160 as it travels along infeed belt 108. Top surface 162 of food 160 is coated with breading material 152 as food 160 passes beneath waves 158 of breading material 152, created by finger assemblies 144 as described with respect to FIG. 4.

In step 214, food and breading material are conducted into a tumble breading apparatus. In one example of step 214, food 160 and breading material 152 are conveyed within clean area 104 and optionally, beneath breading sprinkled by hopper 126, via infeed belt 108. Food and breading material are transferred to a second, internal belt, in step 216, and to a rotary system, in step 218. In one example of steps 216, 218, food 160 is flipped over as it drops from infeed belt 108 to flip belt 124. Un-coated surfaces of food 160 may be exposed to breading material dropping from infeed belt 108 to flip belt 124 during flipping. Food 160 and breading material 152 are transferred from flip belt 124 to a rotary system, in step 218.

Food and breading materials are tumbled, in step 220, and transferred to an output belt for conveyance from the tumble breading system, in step 222. In one example of steps 218-220, food 160 is transferred from flip belt 124 to a channel 138 of first tumbler 128A, in generally the same linear order in which food 160 is arranged across infeed belt 108, in step 212. Tumbler 128A rotates to transfer (i.e., drop) food 160 to a channel 138 of a second tumbler, e.g., tumbler 128B. The number of tumblers 128 used to tumble food 160 may be customized according to food type, size or breading preference, for example tumbling hardy food through more tumblers and delicate foods through fewer tumblers, and tumbling larger foods through larger tumblers and smaller foods through smaller tumblers. Likewise, more tumblers 128 may be used where it is desired to work breading 152 thoroughly into muscle, pores or cavities of food 160. As noted above, rotary assemblies 130 may be swapped to customize tumble breading system 100 for handling of specific foods.

Food 160 is transferred from a final tumbler 128 of rotary assembly 130 (for example, from tumbler 128E, in FIGS. 1 and 5-7, or from tumbler 128C, in FIGS. 2 and 8) to output belt 132 in generally the linear order in which it was placed upon infeed belt 108 (Step 212), and conveyed from clean area 104 to the outside of tumble breading apparatus 100.

Excess material is dislodged from the food, in step 224. For example, excess breading 152 falls from food 160 during conveyance, as well as during transfer to output belt 132). Additional loose breading 152 may be removed using a fan or blower. In one example, blower 184 dislodges loose breading material 152 from food 160, and blows the loose material over mesh output belt 132. Loose breading material 152 falls through openings in the mesh, and is collected, in step 226. In one example of step 226, breading material 152 dislodged from food 160 (e.g., by blower 184 and/or by transferring to output belt 222), and breading material dropped from tumblers 128, falls into reclamation apparatus 134 and/or chamber 140. Reclamation apparatus 134 may be a removable sieve that allows fine breading material 152 to pass through and collect within chamber 140, while catching clumps of breading material 152 and any bits of food 160 that may have escaped output belt 222. Reclamation apparatus 134 may thus be easily removed for cleaning. Likewise, reclamation apparatus 134 may serve as a sifter for newly-input breading material 152. New breading material 152 may be deposited directly into reclamation apparatus 134 and shaken or vibrated to sift the breading material into chamber 140. Optionally, breading material 152 collects or is deposited directly into chamber 140, which may be a removable drawer, pan or other enclosure, or which may be a bottom portion within housing 102.

From chamber 140, new or reclaimed breading material 152 is distributed from chamber 140 to infeed belt 108, e.g., via a breading material conveyor 142 or an auger mechanism (step 210).

Having now described the preferred embodiment of the breading machine of the present invention, it will be realized that the same is susceptible to various modifications and arrangements of parts without departing from the inventive concept thereof as is defined in the appended claims.

What is claimed is:

1. A tumble breading system for applying a breading material to a food, comprising:
    an infeed belt for conveying the food and a quantity of breading material into a housing;
    a plurality of rotary tumblers within the housing, for accepting the food and the breading material and tumbling the food with the breading material, to bread the food, wherein the rotary tumblers are vertically offset and each rotary tumbler comprises a plurality of longitudinal channels for accepting the food and the breading material in a linear order approximating an order in which the food spans the infeed belt; and
    an output belt for accepting the coated food from the tumblers and conveying the breaded food from the housing, wherein the food and the breading material are transferred between the channels and to the output belt, as the tumblers rotate.

2. The system of claim 1, the plurality of rotary tumblers provided as a removable rotary assembly.

3. The system of claim 1, the housing comprising an internal clean area for separating at least the rotary tumblers from power assemblies disposed along an outer surface of the housing, for powering the tumble breading system.

4. The system of claim 3, further comprising an elevated hopper positioned within the clean area and above one or both of a proximal end of the infeed belt and the rotary tumblers, for storing and releasing additional breading material onto the infeed belt, the rotary tumblers and the food.

5. The system of claim 3, further comprising a flip belt within the housing, for accepting the food from the infeed belt and for transferring the food to the plurality of rotary tumblers.

6. The system of claim 5, wherein the infeed belt is positioned above the flip belt, such that food partially or completely flips during transfer from the infeed belt to the flip belt.

7. The system of claim 1, further comprising:
an inner breading chamber for accepting and storing the quantity of breading material; and
a breading material conveyor, for conveying the breading material from the inner chamber to the infeed belt.

8. The system of claim 7, the output belt disposed above the inner chamber and comprising openings for allowing loose breading material to pass through to the inner breading chamber.

9. The system of claim 8, further comprising a removable reclamation assembly disposed beneath the rotary tumblers and the output belt and above the inner breading chamber, for accepting the breading material from the rotary tumblers and the output belt, the reclamation assembly configured for permitting fine particles of breading material to pass through to the inner breading chamber, while capturing clumped breading material and food particles.

10. The system of claim 9, the reclamation assembly comprising a sieve for sifting the breading material to break up the clumped breading material.

11. The system of claim 1, further comprising at least one finger assembly for distributing the breading material across the infeed belt; wherein the breading material forms a wave against the finger assembly as the infeed belt conveys the food and the breading material into the housing.

12. The system of claim 11, the at least one finger assembly being height-adjustable to allow the food to travel beneath the wave and the assembly, to coat an upper surface of the food.

13. A tumble breading system for applying a breading material to a food, comprising:
a housing designating an internal clean area;
an infeed belt for conveying the breading material and the food, arranged across the infeed belt in an infeed order, into the clean area;
a rotary assembly having a plurality of vertically offset rotating tumblers, for accepting and tumbling the food with the breading material as the tumblers rotate, to bread the food, wherein the rotary assembly is swappable with another rotary assembly differing in number or arrangement of tumblers; and
an output belt for accepting the breaded food from the tumblers and for conveying the breaded foods from the clean area and the housing;
wherein the food arrives at the output belt in substantially the infeed order.

14. The system of claim 13, further comprising a flip belt for conveying the food and the breading material from the infeed belt to the rotary assembly, the flip belt driven separately from the infeed belt and the output belt.

15. The system of claim 13, each tumbler comprising one or more longitudinal channels for holding the breading material and the food.

16. The system of claim 13, the outfeed belt configured to hold the breaded food and allow excess breading material to pass through to a removable reclamation assembly, the reclamation assembly having a sieve portion for separating clumped breading material and food particles from reusable breading material.

17. The system of claim 16, further comprising an inner breading chamber accessible via a breading port in the housing and disposed beneath the reclamation assembly, for accepting and storing the reusable breading material and additional breading material;
wherein the infeed belt conveys one or both of the reusable and additional breading material from the inner chamber to the infeed belt.

18. The system of claim 13, further comprising a blower proximate the output belt, for removing excess breading material from the food and the output belt.

19. A tumble breading system for applying a breading material to a food, comprising a rotary assembly for fitting with a breading machine, proximate an infeed to the machine, the rotary assembly having:
a first tumbler with a plurality of first longitudinal channels, for consecutively accepting the food from the infeed as the tumbler rotates to expose subsequent first longitudinal channels, and for rotating the food with the breading material, within the first longitudinal channels; and
at least a second tumbler offset beneath the first tumbler and having a plurality of second longitudinal channels for consecutively accepting the food and the breading material from the plurality of first channels, as the second tumbler rotates opposite the first tumbler;
wherein rotation of the food with the breading material works the breading material into and onto the food.

20. The system of claim 19, wherein the first and second longitudinal channels accept and maintaining the food in an order corresponding to a linear order in which the food is arranged at the infeed.

21. The system of claim 19, wherein the rotary assembly is configured as a retrofit assembly for a conventional drum breader.

22. A tumble breading system for applying a breading material to a food, comprising:
a housing;
means for distributing breading material from a breading material chamber within the housing to an infeed belt, across which the food is arranged;
means for passing the food beneath the breading material;
a flip belt for accepting the food and the breading material from the distribution means;
a plurality of vertically offset, counter-rotational tumblers for accepting the food and the breading material from the flip belt and for tumbling the food with the breading material as the food and the breading material are passed between the tumblers;
an output belt for accepting breaded food from the tumblers and for passing excess breading material therethrough;
a reclamation assembly disposed beneath the tumblers and the output belt, for sifting the excess breading material to separate reusable breading material from clumped breading material;
wherein reusable breading material passes through the reclamation assembly to the breading chamber.

* * * * *